Patented May 7, 1929.

1,711,807

UNITED STATES PATENT OFFICE.

LAURENCE RUTHERFORD PRESTON, OF DEVONPORT, ENGLAND.

SOLDER FOR ALUMINUM OR ITS ALLOYS.

No Drawing. Application filed December 8, 1926, Serial No. 153,476, and in Great Britain December 14, 1925.

This invention has reference to the soldering of aluminum and its alloys and has for its object to provide for this purpose a new or improved composition of solder, and a special method of manufacturing same.

The composition of the solder employed according to this invention is suitable for use in the repairing or jointing of sheet and cast aluminum and aluminum alloys and is cast in specially coated moulds.

In the British Pharmaceutal Codex, dated 1923, "Silver sand" is defined as follows:—

*Arena purificata*, Purified sand.—Sand consists of grains of mineral matter resulting from the disintegration of rocks, and is frequently yellow or brown owing to the presence of ferric oxide. Silver sand or "Calais" sand is nearly pure silica and is usually of inland origin. Purified sand is obtained by sifting good white sand to free it from mechanical impurities, afterwards heating it in a mixture of equal volumes of hydrochloric acid and water for half an hour. The sand is then allowed to subside, the acid liquid decanted, and the sand washed with distilled water, until the washings cease to have any acid reaction. It is then dried.

For instance, it is found that for the purpose of repairing castings and sheet aluminum or aluminum alloys beneficial effects are obtained by coating the solder with a mixture of stearic acid, silver sand and powdered phosphor tin and this coating which is formed on the solder appears to have the effect of quickly breaking up the film of aluminum oxide during the process of soldering and does not leave an excess of phosphorus or stearic acid in the repair or joint.

One approved method of applying this coating to the solder is by coating the moulds, in which the solder is formed into sticks or ingots, with a mixture of stearic acid, silver sand and powdered phosphor tin and the same mixture may be sprinkled on the top surface of the solder if open moulds are being used.

For such purposes the improved composition of solder may be approximately as follows:—

|  | Per cent. |
|---|---|
| Tin | 75 |
| Zinc | 22 |
| Aluminum | 2 |
| Bismuth | 1 |

The foregoing composition is coated with a mixture approximately as follows:—

|  | Per cent. |
|---|---|
| Stearic acid | 25 |
| Silver sand | 25 |
| 5% phosphor tin | 50 |

The soldering operation with this solder follows the conventional practice excepting that no flux is required.

By means of a solder of substantially the composition above stated it has been amply demonstrated that aluminum and its alloys can be successfully soldered therewith and prolonged tests show that the joints or repairs will stand more severe strains and exposure to atmospheric conditions than solders having phosphorus impregnated in the solder.

What I claim and desire to secure by Letters Patent is:—

1. As an article of manufacture, a solder comprising tin, zinc, aluminum, bismuth and coated with stearic acid, silver sand and phosphor tin.

2. As an article of manufacture, a solder composed approximately of 75% tin, 22% zinc, 2% aluminum, 1% bismuth, and coated with a composition composed approximately of 25% stearic acid, 25% silver sand and 50% of 5% phosphor tin.

In testimony whereof I affix my signature.

LAURENCE RUTHERFORD PRESTON.